United States Patent Office 3,243,416
Patented Mar. 29, 1966

3,243,416
2-NORBORNYLMETHYL ESTERS OF ACRYLIC AND METHACRYLIC ACIDS AND POLYMERS THEREOF
John R. Caldwell, Winston J. Jackson, Jr., and Clarence C. Dannelly, Kingsport, Tenn., assignors to Eastman Kodak Company, Rochester, N.Y., a corporation of New Jersey
No Drawing. Filed Jan. 7, 1964, Ser. No. 336,138
23 Claims. (Cl. 260—85.5)

This invention relates to new vinyl monomers and polymers and their preparations. More particularly, the invention concerns polymeric materials prepared from acrylic and methacrylic esters of 2-norbornylmethanol and substituted norbornylmethanols alone or with copolymerizable materials.

In the field of synthetic polymers useful, for example, as films, fibers, molded articles, surface coatings, and lubricating oil viscosity stabilizers, the search for new materials exhibiting improved processability, thermal and hydrolytic stability, solubility in convenient solvents at low temperatures, dyeability, and the like, is a continuous one.

Objects of the present invention, therefore, are: to provide polymers having one or more improved properties such as processability, thermal stability, hydrolytic stability, solubility and dyeability; to provide the monomers necessary for their preparations; and to provide a commercially practicable process for preparing the polymers.

These and other objects have been achieved in accordance with the present invention through the discovery that either the homo- or copolymers with other types of unsaturated monomers, of 2-norbornylmethyl esters of acrylic or methacrylic acid monomers having the formula

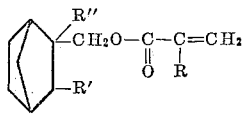

wherein R is selected from the group consisting of a hydrogen atom and a methyl group, R' is selected from the group consisting of a hydrogen atom, a monovalent aliphatic group of from 1 to 4 carbons, and a phenyl group; R" is selected from the group consisting of a hydrogen atom and a monovalent aliphatic group of from 1 to 2 carbons, have the desirable aforesaid properties. Although certain known polymers appear to be quite similar, chemically and physically, to the present ones, careful comparisons reveal basic distinctions and thus different utility.

The unobviousness of this discovery is in part evidenced by the high decomposition rates of certain acrylic esters, for example, 2.01%/hr. at 575° F. for the acrylic esters of fenchyl alcohol, which high rate is in evidence in the polymer thereof. The decomposition rate of the acrylic ester of 2-methyl-2-norbornylmethanol, on the other hand, was only 0.08%/hr. at 575° F.

The monomeric esters of the present invention may be prepared by refluxing a mixture containing the acrylic or methacrylic acid, the norbornylmethanol, benzene polymerization inhibitor, and an acidic catalyst. The reaction proceeds according to the reaction series.

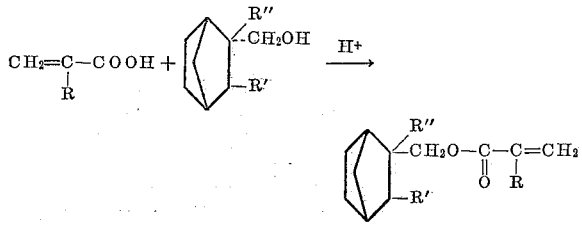

A mixture containing the acid, hydroxy compound, benzene, hydroquinone (polymerization inhibitor), and an acidic catalyst such as sulfuric acid or toluene sulfonic acid is refluxed, and the water which is formed in the reaction is removed in the benzene azeotrope and collected in a Dean-Stark trap. The reaction is completed when no more water is obtained. A slight excess of acrylic (or methacrylic) acid is added to ensure completion of the reaction.

The hydroxy compounds may be prepared by hydrogenating the double bond of the Diels-Alder adduct of cyclopentadiene or an alkylcyclopentadiene with allyl or methallyl alcohol or an alkyl-substituted allyl alcohol. It is seen that by using the properly substituted R, R', and R" reactants, the desired ester can be obtained.

The following examples further illustrate the monomer preparation.

EXAMPLE 1

2-norbornylmethyl acrylate

A mixture containing 202 g. (1.6 moles) of 2-norbornylmethanol, 130 g. (1.8 moles) of acrylic acid (inhibited with methylene blue), 300 ml. of benzene, 0.2 g. of hydroquinone, and 8 g. of p-toluenesulfonic acid was refluxed until no more water collected in a Dean-Stark trap attached to a short Vigreux column. This required 3 hours, and 29 ml. of water was obtained. The solution was cooled, diluted with more benzene, and treated with Kleenflo to remove the methylene blue. It was then consecutively washed with water, sodium bicarbonate solution, and dried with sodium sulfate. Copper tinsel and a small amount of cuprous chloride were added to inhibit polymerization during distillation through a short column containing copper tinsel. The ester distilled at 55–57° C./0.5 mm.

Analysis.—Calcd. for $C_{11}H_{16}O_2$: C, 73.4; H, 8.9. Found: C, 73.6; H, 8.8.

EXAMPLE 2

3-methyl-2-norbornylmethyl acrylate

This ester was prepared from 3-methyl-2-norbornylmethanol according to the procedure of Example 1 and boiled at 80–86° C./2–3 mm. ($n_D^{20}$ 1.4761.)

EXAMPLE 3

2,3-dimethyl-2-norbornylmethyl acrylate

This ester was prepared from 2,3-dimethyl-2-norbornylmethanol according to the procedure of Example 1 and had a boiling point of 90–92° C./2 mm.

EXAMPLE 4

3-phenyl-2-norbornylmethyl acrylate

This ester was prepared from 3-phenyl-2-norbornylmethanol according to the procedure of Example 1. The product obtained after removal of the solvent was used without further purification.

EXAMPLE 5

2-norbornylmethyl methacrylate

This ester was prepared from methacrylic acid and 2-norbornylmethanol with the procedure of Example 1 (except for the Kleenflo treatment). It distilled at 93–94° C./3 mm.

*Analysis.*—Calcd. for $C_{12}H_{18}O_2$: C, 74.2; H, 9.3. Found: C, 74.3; H, 9.4.

EXAMPLE 6

3-methyl-2-norbornylmethyl methacrylate

This ester was prepared as in Example 5, using 3-methyl-2-norbornylmethanol. It distilled at 99–102° C./3 mm.

These acrylates and methacrylates form homopolymers and also polymerize with a wide variety of compounds that contain an ethylenic linkage. These comonomers may contain either $CH_2{=}C{<}$, ${>}C{=}C{<}$, or

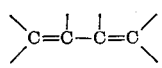

type of unsaturation and a great many of them are listed in U.S. Patent 2,396,785. Examples of these compounds includes esters of acrylic, methacrylic, maleic, fumaric, and itaconic acids such as methyl acrylate, methyl methacrylate, diethyl maleate, diethyl fumarate, and methyl itaconate. The corresponding N-mono- and N,N-disubstituted amides of the acids listed above are also included. Vinyl esters and vinyl ethers as well as vinyl ketones can be used. The vinyl derivatives of benzene are useful as represented by styrene, α-methylstyrene, p-methylstyrene, and α-acetoxystyrene. Acrylonitrile and α-methacrylonitrile can be employed. Representative halogen compounds include vinyl chloride, vinylidene chloride, vinyl fluoride, vinylidene fluoride, tetrafluoroethylene, and chloro-trifluorethylene. Other types of useful monomers include ethylene, isobutylene, N-vinyl imides, N-vinyl lactams, isopropenylacetate, and allyl alcohol.

It is noted that the percentage of the norbornylmethyl esters employed in copolymerizations may be varied in accordance with the polymer properties desired. Relatively small amounts thereof will alter the properties of certain polymers. For example, where about 10 parts of 2-norbornylmethyl methacrylate were copolymerized with about 80 parts of acrylonitrile, the polymer became soluble in dimethyl formamide at below room temperature. This solubility of course obviates high processing temperatures and represents a great advantage, particularly in fiber-forming operations. It is noted that the unmodified acrylonitrile polymer is soluble in dimethyl formamide only above about 45° C. A further and important contrast is that between the effects on softening points of the present and other copolymerizable modifiers. Although bulky, the norbornylmethyl ester side groups can be tolerated in acrylonitrile polymers in particular up to a level (approximately 15%) without lowering the softening point of the polymer. At such modifier content, the dyeability of the polymer dramatically improves. Such cannot be conveniently achieved with other modifiers which lower the softening point at considerably lower concentrations. For most applications it is preferred that from about 5 to about 70% of the norbornylmethyl esters be present in the polymers although homo- and copolymers of these esters are useful.

The homopolymers and interpolymers of the invention are conveniently made by carrying out the polymerization in organic solvents such as the lower alcohols, ketones, hydrocarbons, or esters. Acetonitrile, dioxane, and the glycol monoethers may be employed. Mass or bulk polymerization may also be used. Suitable free-radical catalysts include benzoyl peroxide, acetyl peroxide, tertiary butyl hydroperoxide, and azo-bis-isobutyronitrile. In general, the inorganic peroxygen, organic peroxygen, azo and redox free-radical catalysts may be used. The polymers may also be prepared by dispersing the monomers in water and adding suitable dispersing agents and catalysts. Satisfactory catalysts include sodium persulfate, hydrogen peroxide, sodium perborate, etc. Sodium dodecyl sulfate, sodium octadecyl sulfate, soaps, and sulfonated mineral oil are examples of dispersing agents that may be used to produce emulsion polymers. Polymerization temperatures of 0–150° C. are generally employed.

POLYMER PREPARATION

EXAMPLE 7

The following materials were mixed in a 250-ml. flask and heated at reflux for 8 hours.

| | G. |
|---|---|
| 2-norbornylmethyl acrylate | 25 |
| Benzene | 75 |
| Benzoyl peroxide | 0.5 |

A clear viscous solution was obtained and poured into acetonitrile to precipitate the polymer. The polymer was dissolved in benzene and precipitated with acetonitrile several times to purify the polymer. The yield of polymer was 93%. The polymer was tested as an oil additive in mineral oil and in di-2-ethylhexyl sebacate. The table below compares the thermal stability of this polymer with that of Acryloid HF–825, a commercial acrylic polymer oil additive. These additives were tested in Plexol 201, a synthetic lubricant. The lubricant was heated to 500° F. for 20 hours.

| Material Being Tested | Viscosity at 100° F. Before Test (Centistokes) | Viscosity at 100° F. After Test | Percent Change |
|---|---|---|---|
| Plexol 201 Containing 4% Acryloid HF–825 | 21.10 | 15.38 | −27.1 |
| Plexol 201 Containing 4% 2-Norbornyl-Methyl Acrylate | 21.83 | 16.51 | −24.4 |
| Plexol 201 | 12.75 | 12.91 | +1.2 |

The third column of figures shows that 2-norbornylmethyl acrylate is more stable to high temperatures than Acryloid HF–825. In the second column the values indicate that 2-norbornylmethyl acrylate contributed more viscosity to Plexol 201 after heating than did Acryloid HF–201, a commercial acrylic polymer oil additive.

EXAMPLE 8

The following materials were mixed in a 250-ml. flask and heated at reflux for 8 hours.

| | G. |
|---|---|
| 3-methyl-2-norbornylmethyl acrylate | 25 |
| Methyl methacrylate | 25 |
| Benzene | 100 |
| Acetyl peroxide | 0.5 |

A clear viscous liquid was obtained and poured into acetonitrile to precipitate the polymer. The yield of purified polymer was 96%. This polymer was tested as a molding plastic, as an oil additive, and as a protective coating of the lacquer type. The polymer molded well to give clear molded objects which had good impact and tensile strength. This polymer had excellent thermal stability at temperatures below 550° F.

EXAMPLE 9

The following materials were mixed in a 500-ml. flask.

| | G. |
|---|---|
| 2,3-dimethyl-2-norbornylmethyl acrylate | 50 |
| Styrene | 25 |
| Water | 200 |
| Sulfonated mineral oil | 1.0 |
| Ammonium persulfate | 0.5 |
| Sodium meta-bisulfite | 0.25 |

This mixture was stirred at 50° C. for 4 hours. An emulsion of a polymer was obtained. The yield of polymer was 97%. Clear, flexible films were obtained by evaporating the water from the emulsion.

EXAMPLE 10

Using the same method as Example 9, a copolymer was prepared using 60 parts of vinyl acetate and 40 parts of 3-phenyl-2-norbornylmethyl acrylate. A yield of 95% was obtained. The emulsion obtained was used to cast clear, flexible films. These films had good resistance to sunlight.

EXAMPLE 11

Using the method described in Example 9, a copolymer was prepared using 85 parts of acrylonitrile and 15 parts of 2-norbornylmethyl methacrylate. The emulsion obtained was precipitated with a sodium sulfate solution. The precipitated polymer was washed and dried and then dissolved in dimethylformamide. This solution was wet-spun into fibers which had a strength of 2.8 g./denier and an elongation of 18%.

EXAMPLE 12

Using the method described in Example 7, a polymer was prepared from 3-methyl-2-norbornylmethyl methacrylate. This polymer was tested as an oil additive in mineral oil and in Phexol 201. This polymer had good thermal stability compared to Acryloid HF–825, a commercial oil additive.

EXAMPLE 13

Using the method described in Example 7, a copolymer was prepared using 50 parts methyl methacrylate and 50 parts 2-norbornylmethyl methacrylate. This polymer was tested as a molding plastic, an oil additive, and as a protective coating. The copolymer made clear, hard molded objects using both injection and compression molding techniques. It had excellent resistance to sunlight, a high gloss when films were cast from solvents, and good mar resistance. These properties are desirable for protective coatings of the lacquer type.

The invention has been described in detail with particular reference to preferred embodiments thereof, but it will be understood that variations and modifications can be effected within the spirit and scope of the invention as described hereinabove and as defined in the appended claims.

We claim:
1. A compound of the formula

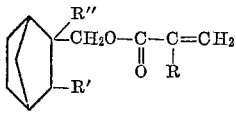

wherein R is selected from the group consisting of a hydrogen atom and a methyl group, R' is selected from the group consisting of a hydrogen atom, a monovalent aliphatic group of from 1 to 4 carbons, and a phenyl group, and R" is selected from the group consisting of a hydrogen atom and a monovalent aliphatic group of from 1 to 2 carbons.

2. The compound 2-norbornylmethyl acrylate.
3. The compound 3-methyl-2-norbornylmethyl acrylate.
4. The compound 2,3-dimethyl-2-norbornylmethyl acrylate.
5. The compound 2-norbornylmethyl methacrylate.
6. The compound 3-phenyl-2-norbornylmethyl acrylate.
7. The compound 3-methyl-2-norbornylmethyl methacrylate.

8. A polymeric composition having the recurring structural unit

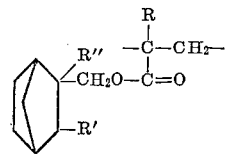

wherein R is selected from the group consisting of a hydrogen atom and a methyl group, R' is selected from the group consisting of a hydrogen atom, a monovalent aliphatic group of from 1 to 4 carbons, and a phenyl group, and R" is selected from the group consisting of a hydrogen atom and a monovalent aliphatic group of from 1 to 2 carbons.

9. The polymeric composition of claim 8 wherein the said recurring structural unit comprises about 5% by weight of the polymer.

10. A copolymer of at least one compound having the formula

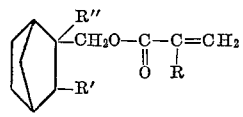

wherein R is selected from the group consisting of a hydrogen atom and a methyl group, R' is selected from the group consisting of a hydrogen atom, a monovalent aliphatic group of from 1 to 4 carbons, and a phenyl group, and R" is selected from the group consisting of a hydrogen atom and a monovalent aliphatic group of from 1 to 2 carbons, and at least one member selected from the group consisting of methyl methacrylate, styrene, vinyl acetate, and acrylonitrile.

11. The homopolymer of 2-norbornylmethyl acrylate.
12. The copolymer of 3-methyl-2-norbornylmethyl acrylate and methyl methacrylate.
13. The copolymer of 2,3-dimethyl-2-norbornylmethyl acrylate and styrene.
14. The copolymer of 3-phenyl-2-norbornylmethyl acrylate and vinyl acetate.
15. The copolymer of 2-norbornylmethyl methacrylate and acrylonitrile.
16. The homopolymer of 3-methyl-2-norbornylmethyl methacrylate.
17. The copolymer of 2-norbornylmethyl methacrylate and methyl methacrylate.
18. A fiber consisting essentially of the composition of claim 8.
19. A film consisting essentially of the composition of claim 8.
20. A molded article consisting essentially of the composition of claim 8.
21. A fiber consisting essentially of the composition of claim 10.
22. A film consisting essentially of the composition of claim 10.
23. A molded article consisting essentially of the composition of claim 10.

References Cited by the Examiner

UNITED STATES PATENTS

| | | | |
|---|---|---|---|
| 2,838,479 | 6/1958 | Biletch | 260—486 |
| 3,038,887 | 6/1962 | Caldwell et al. | 260—486 |

JOSEPH L. SCHOFER, *Primary Examiner.*

DONALD E. CZAJA, *Examiner.*

H. WONG, *Assistant Examiner.*